US010311676B2

(12) United States Patent
Carlson et al.

(10) Patent No.: US 10,311,676 B2
(45) **Date of Patent: *Jun. 4, 2019**

(54) METHOD OF GAMING, A GAMING SYSTEM AND A GAME CONTROLLER

(71) Applicant: Aristocrat Technologies Australia Pty Limited, North Ryde (AU)

(72) Inventors: Rex Carlson, Henderson, NV (US); Scott Monroe Stewart, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,393

(22) Filed: Aug. 7, 2017

(65) Prior Publication Data

US 2017/0337774 A1 Nov. 23, 2017

Related U.S. Application Data

(63) Continuation of application No. 13/114,621, filed on May 24, 2011, now Pat. No. 9,728,045.

(60) Provisional application No. 61/348,087, filed on May 25, 2010.

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC .......... *G07F 17/3265* (2013.01); *G07F 17/34* (2013.01)

(58) Field of Classification Search

CPC ..... G07F 17/326; G07F 17/3265; G07F 17/34

USPC ........................................................ 463/16–20

See application file for complete search history.

(56) References Cited

U.S. PATENT DOCUMENTS

| | | | | |
|---|---|---|---|---|
| 3,733,075 A | | 5/1973 | Hooker et al. | |
| 5,275,400 A | * | 1/1994 | Weingardt | A63F 3/081 273/143 R |
| 5,342,049 A | | 8/1994 | Wichinsky et al. | |
| 6,146,271 A | * | 11/2000 | Kadlic | A63F 1/00 273/292 |
| 6,494,025 B1 | | 12/2002 | Killen | |
| 6,589,114 B2 | | 7/2003 | Rose | |
| 6,731,313 B1 | | 5/2004 | Kaminkow | |
| 6,855,054 B2 | | 2/2005 | White et al. | |

(Continued)

FOREIGN PATENT DOCUMENTS

| | | |
|---|---|---|
| AU | 7892400 | 4/2001 |
| AU | 2007211928 | 3/2008 |

(Continued)

*Primary Examiner* — Michael A Cuff

(74) *Attorney, Agent, or Firm* — McAndrews, Held & Malloy, Ltd.

(57) ABSTRACT

This is disclosed an electronic method of gaming. The method comprises selecting a symbol for display at each display position of a plurality of sets of display positions (710), modifying the displayed symbols by interchanging a first set of symbols displayed at a first set of display positions with a second set of symbols displayed at a second set of display positions (740), and determining whether to make an award based on the symbols displayed at the plurality of sets of display positions as modified 750. There is also disclosed a gaming system, a game controller and a gaming machine corresponding to the electronic method.

20 Claims, 7 Drawing Sheets

(56) References Cited

U.S. PATENT DOCUMENTS

| | | | |
|---|---|---|---|
| 7,168,872 B1 | 1/2007 | Capps | |
| 7,578,735 B2 | 8/2009 | Frizzell et al. | |
| 7,690,985 B1 | 4/2010 | Muskin et al. | |
| 9,773,366 B2 * | 9/2017 | Graham | G07F 17/32 |
| 2001/0031659 A1 * | 10/2001 | Perrie | A63F 3/00075 463/18 |
| 2003/0114218 A1 | 6/2003 | McClintic | |
| 2004/0166918 A1 | 8/2004 | Walker | |
| 2005/0079908 A1 * | 4/2005 | Pacey | G07F 17/32 463/20 |
| 2006/0046830 A1 | 3/2006 | Webb | |
| 2006/0281525 A1 | 12/2006 | Borissov | |
| 2007/0015570 A1 | 1/2007 | Pryzby | |
| 2007/0021179 A1 * | 1/2007 | Kobayashi | G07F 17/3211 463/16 |
| 2007/0021188 A1 | 1/2007 | Rodgers et al. | |
| 2007/0060252 A1 | 3/2007 | Taylor | |
| 2007/0060256 A1 | 3/2007 | Yoshimura | |
| 2007/0060344 A1 | 3/2007 | Watkins | |
| 2008/0039174 A1 * | 2/2008 | Litman | 463/20 |
| 2008/0045325 A1 | 2/2008 | Kato | |
| 2008/0076532 A1 | 3/2008 | Graham et al. | |
| 2008/0214267 A1 | 9/2008 | Ghaly | |
| 2009/0117978 A1 * | 5/2009 | Dias Pires | G07F 17/32 463/20 |
| 2009/0137311 A1 * | 5/2009 | Iverson | G07F 17/3202 463/20 |
| 2009/0227353 A1 * | 9/2009 | Yoshizawa | G07F 17/3265 463/20 |
| 2009/0239631 A1 | 9/2009 | Aoki et al. | |
| 2010/0075736 A1 * | 3/2010 | Muir | G07F 17/32 463/20 |
| 2010/0298041 A1 * | 11/2010 | Berman | G07F 17/3265 463/20 |
| 2011/0053675 A1 * | 3/2011 | Aoki | G07F 17/3202 463/20 |
| 2011/0111824 A1 * | 5/2011 | Cuddy | G07F 17/3239 463/20 |

FOREIGN PATENT DOCUMENTS

| | | | |
|---|---|---|---|
| AU | 2007237307 | | 7/2008 |
| AU | 2007240221 | | 9/2011 |
| CA | 2516545 | A1 | 2/2007 |
| DE | 10163261 | A1 | 7/2003 |
| EP | 1473681 | A2 | 11/2004 |
| GB | 1291764 | A | 10/1972 |
| GB | 2081952 | A | 2/1982 |
| GB | 2429449 | A | 2/2007 |
| IT | 1225662 | B | 11/1990 |
| JP | 10052525 | A | 2/1998 |
| JP | 2001266534 | A | 9/2001 |
| JP | 2003010384 | A | 1/2003 |
| JP | 2003236038 | A | 8/2003 |
| JP | 2003260171 | A | 9/2003 |
| JP | 2003275365 | A | 9/2003 |
| JP | 2003339940 | A | 12/2003 |
| JP | 2004144786 | A | 5/2004 |
| JP | 2006055243 | A | 3/2006 |
| JP | 2006223340 | A | 8/2006 |
| JP | 2006230509 | A | 9/2006 |
| JP | 2006263138 | A | 10/2006 |
| JP | 2006326126 | A | 12/2006 |
| JP | 2006339280 | A | 12/2006 |
| JP | 2006340866 | A | 12/2006 |
| KR | 940004497 | B | 5/1994 |
| KR | 950003211 | B | 4/1995 |
| KR | 950005519 | Y | 7/1995 |
| KR | 20010048198 | | 6/2001 |
| KR | 20030016141 | A | 2/2003 |
| KR | 20040025251 | A | 3/2004 |
| KR | 20040052294 | A | 6/2004 |
| TW | 255212 | B | 5/2006 |
| TW | 260200 | B | 8/2006 |
| WO | 200043303 | A1 | 7/2000 |
| WO | 2004014133 | A1 | 2/2004 |
| WO | 2004077368 | A2 | 9/2004 |
| WO | 2004104283 | A2 | 12/2004 |
| WO | 2006039047 | A2 | 4/2006 |
| WO | 2007009672 | A1 | 1/2007 |
| WO | 2007032914 | A2 | 3/2007 |
| WO | 2007036242 | A1 | 4/2007 |

* cited by examiner

METHOD OF GAMING, A GAMING SYSTEM AND A GAME CONTROLLER

RELATED APPLICATIONS

This application is a continuation of U.S. patent application Ser. No. 13/114,621 having a filing date of May 24, 2011, expected to issue as U.S. Pat. No. 9,728,045 on Aug. 8, 2017, which claims priority to U.S. Provisional Application No. 61/348,087 having a filing date of May 25, 2010, all of which are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system, and a game controller.

In many gaming venues, gaming systems are provided in the form of gaming machines. A popular game available on such gaming machines is a spinning-reel type game. In a 5×3 spinning-reel type game, five reels are displayed to a player, each of the reels corresponding to a column of three display positions. Typically, a player initiates a play of the game by placing a wager and causing all the reels to spin. When the spinning reels stop, they reveal a symbol for each display position of each reel, and an award is provided to the player if the displayed symbols comprise a winning symbol combination.

While such gaming systems provide players with enjoyment, a need exists for alternative gaming systems in order to maintain or increase player enjoyment.

BRIEF SUMMARY OF THE INVENTION

In a first aspect, the invention provides an electronic method of gaming comprising:

selecting a symbol for display at each display position of a plurality of sets of display positions;

modifying the displayed symbols by interchanging a first set of symbols displayed at a first set of display positions with a second set of symbols displayed at a second set of display positions; and determining whether to make an award based on the symbols displayed at the plurality of sets of display positions as modified.

In an embodiment, each set of display positions comprises a column of display positions.

In an embodiment, the method further comprises determining whether to make another award based on the symbols displayed at the plurality of sets of display positions prior to modifying the displayed symbols.

In an embodiment, the method further comprises determining whether a modification condition is met and modifying the displayed symbols upon the modification condition being met.

In an embodiment, the modification condition is that an award is to be made.

In an embodiment, the modification condition is that an award is not to be made.

In an embodiment, the modification condition is that an ante bet has been made.

In an embodiment, the determination of whether the modification condition is met is performed randomly.

In an embodiment, after it has been determined that awards may be made both before and after modification, the method further comprises displaying an option to select either the award determined before modification or the award determined after modification.

In an embodiment, modifying the displayed symbols further comprises interchanging a third set of symbols displayed at a third set of display positions with a fourth set of symbols displayed at a fourth set of display positions.

In an embodiment, the method further comprises: conducting a further round of symbol modification involving two different sets of symbols displayed at two different sets of display positions; and determining whether to make an award based on the symbols displayed at the plurality of sets of display positions as twice modified.

In an embodiment, the method further comprises selecting one of the plurality of sets of display positions to be the first set of display positions and another one of the plurality of sets of display positions to be the second set of display positions.

In an embodiment, the first set of display positions and the second set of display positions are selected randomly.

In an embodiment, the modification of symbols comprises displaying symbols displayed at different display positions swapping with one another.

In an embodiment, the modification of symbols comprises displaying symbols hopping from one display position to another display position.

In an embodiment, the modification of symbols comprises displaying symbols sliding from one display position to another display position.

In an embodiment, the modification of symbols comprises displaying symbols flipping from one symbol to another symbol.

In a second aspect, the invention provides a gaming system comprising:

a display;

a symbol selector arranged to select a symbol for display at each display position of a plurality of sets of display positions on the display;

a display modifier arranged to modify the displayed symbols by interchanging a first set of symbols displayed at a first set of display positions with a second set of symbols displayed at a second set of display positions; and an award determiner arranged to determine whether to make an award based on the symbols displayed at the plurality of sets of display positions as modified.

In an embodiment, each set of display positions is displayed as a column of display positions on the display.

In an embodiment, the award determiner is arranged to determine whether to make an award based on the symbols displayed at the plurality of sets of display positions prior to modification of the displayed symbols.

In an embodiment, the display modifier comprises a modification condition determiner arranged to determine whether a modification condition is met and the display modifier is arranged to modify the displayed symbols upon the modification condition being met.

In an embodiment, the modification condition is that an award is to be made.

In an embodiment, the modification condition is that an award is not to be made.

In an embodiment, the modification condition is that an ante bet has been made.

In an embodiment, the display modifier is arranged to randomly determine whether the modification condition is met.

In an embodiment, after the award determiner has determined that awards may be made both before and after modification, an option to select either the award determined before modification or the award determined after modification is displayed on the display.

In an embodiment, the display modifier is arranged to further modify the displayed symbols by interchanging a third set of symbols displayed at a third set of display positions with a fourth set of symbols displayed at a fourth set of display positions.

In an embodiment, the display modifier is arranged to conduct a further round of symbol modification involving two different sets of symbols displayed at two different sets of display positions, and wherein the award determiner is arranged to determine whether to make an award based on the symbols displayed at the plurality of sets of display positions as twice modified.

In an embodiment, the display modifier comprises a display position selector arranged to select one of the plurality of sets of display positions to be the first set of display positions and another one of the plurality of sets of display positions to be the second set of display positions.

In an embodiment, the display position selector is arranged to select the first set of display positions and the second set of display positions randomly.

In an embodiment, the modification of symbols comprises displaying symbols displayed at different display positions swapping with one another on the display.

In an embodiment, the modification of symbols comprises displaying symbols hopping from one display position to another display position on the display.

In an embodiment, the modification of symbols comprises displaying symbols sliding from one display position to another display position on the display.

In an embodiment, the modification of symbols comprises displaying symbols flipping from one symbol to another symbol on the display.

In a third aspect, the invention provides a game controller for a gaming system, the game controller configured to:

- select a symbol for display at each display position of a plurality of sets of display positions on a display;
- modify the displayed symbols by interchanging a first set of symbols displayed at a first set of display positions with a second set of symbols displayed at a second set of display positions; and
- determine whether to make an award based on the symbols displayed at the plurality of sets of display positions as modified.

In an embodiment, each set of display positions comprises a column of display positions.

In an embodiment, the game controller is configured to determine whether to make another award based on the symbols displayed at the plurality of sets of display positions prior to modifying the displayed symbols.

In an embodiment, the game controller is configured to determine whether a modification condition is met and to modify the displayed symbols upon the modification condition being met.

In an embodiment, the modification condition is that an award is to be made.

In an embodiment, the modification condition is that an award is not to be made.

In an embodiment, the modification condition is that an ante bet has been made.

In an embodiment, the determination of whether the modification condition is met is performed randomly.

In an embodiment, the game controller is configured to, after it has been determined that awards may be made both before and after modification, display an option to select either the award determined before modification or the award determined after modification.

In an embodiment, modifying the displayed symbols further comprises interchanging a third set of symbols displayed at a third set of display positions with a fourth set of symbols displayed at a fourth set of display positions.

In an embodiment, the game controller is configured to:

- conduct a further round of symbol modification involving two different sets of symbols displayed at two different sets of display positions; and
- determine whether to make an award based on the symbols displayed at the plurality of sets of display positions as twice modified.

In an embodiment, the game controller is configured to select one of the plurality of sets of display positions to be the first set of display positions and another one of the plurality of sets of display positions to be the second set of display positions.

In an embodiment, the first set of display positions and the second set of display positions are selected randomly.

In an embodiment, the modification of symbols comprises displaying symbols displayed at different display positions swapping with one another.

In an embodiment, the modification of symbols comprises displaying symbols hopping from one display position to another display position.

In an embodiment, the modification of symbols comprises displaying symbols sliding from one display position to another display position.

In an embodiment, the modification of symbols comprises displaying symbols flipping from one symbol to another symbol.

In a fourth aspect, the invention provides a gaming machine comprising:

- a display; and
- a game controller comprising:
  - a symbol selector arranged to select a symbol for display at each display position of a plurality of sets of display positions on the display;
  - a display modifier arranged to modify the displayed symbols by interchanging a first set of symbols displayed at a first set of display positions with a second set of symbols displayed at a second set of display positions; and
  - an award determiner arranged to determine whether to make an award based on the symbols displayed at the plurality of sets of display positions as modified.

In an embodiment, each set of display positions comprises a column of display positions.

In an embodiment, the game controller is configured to determine whether to make another award based on the symbols displayed at the plurality of sets of display positions prior to modifying the displayed symbols.

In an embodiment, the game controller is configured to determine whether a modification condition is met and to modify the displayed symbols upon the modification condition being met.

In an embodiment, the modification condition is that an award is to be made.

In an embodiment, the modification condition is that an award is not to be made.

In an embodiment, the modification condition is that an ante bet has been made.

In an embodiment, the determination of whether the modification condition is met is performed randomly.

In an embodiment, the game controller is configured to, after it has been determined that awards may be made both before and after modification, display an option to select either the award determined before modification or the award determined after modification.

In an embodiment, modifying the displayed symbols further comprises interchanging a third set of symbols displayed at a third set of display positions with a fourth set of symbols displayed at a fourth set of display positions.

In an embodiment, the game controller is configured to:

conduct a further round of symbol modification involving two different sets of symbols displayed at two different sets of display positions; and determine whether to make an award based on the symbols displayed at the plurality of sets of display positions as twice modified.

In an embodiment, the game controller is configured to select one of the plurality of sets of display positions to be the first set of display positions and another one of the plurality of sets of display positions to be the second set of display positions.

In an embodiment, the first set of display positions and the second set of display positions are selected randomly.

In an embodiment, the modification of symbols comprises displaying symbols displayed at different display positions swapping with one another.

In an embodiment, the modification of symbols comprises displaying symbols hopping from one display position to another display position.

In an embodiment, the modification of symbols comprises displaying symbols sliding from one display position to another display position.

In an embodiment, the modification of symbols comprises displaying symbols flipping from one symbol to another symbol.

In a fifth aspect, the invention provides computer program code which when executed implements the above electronic method.

In a sixth aspect, the invention provides a tangible computer readable medium comprising the above program code.

In a seventh aspect, the invention provides a data signal comprising the above program code.

In an eighth aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
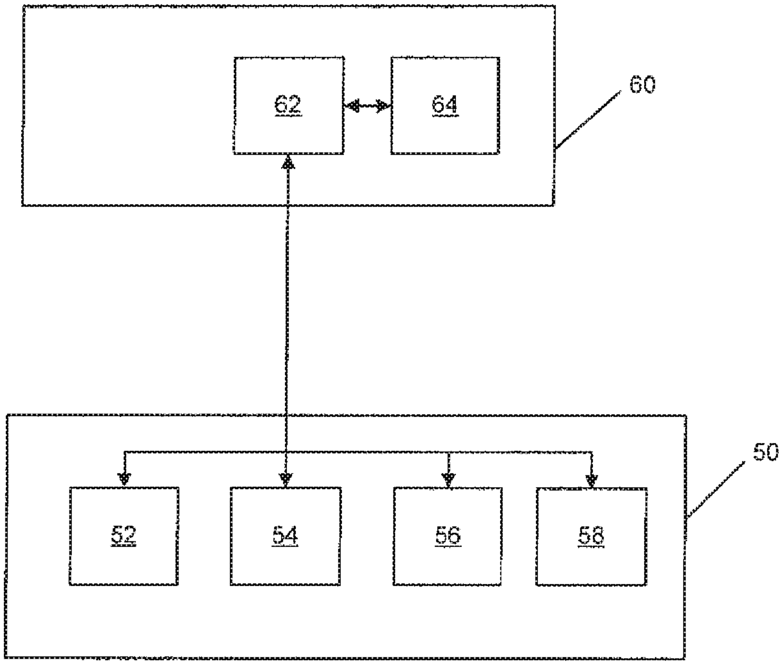
FIG. 1 is a block diagram of the core components of a gaming system.

Referring to the drawings, there is shown a gaming system arranged to implement a game wherein a plurality of symbols are selected and displayed at a plurality of sets of display positions. During game play, the displayed symbols are modified by interchanging a first set of symbols displayed at a first set of display positions with a second set of symbols displayed at a second set of display positions.

Advantageously, the gaming system provides an alternative or additional opportunity to win.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
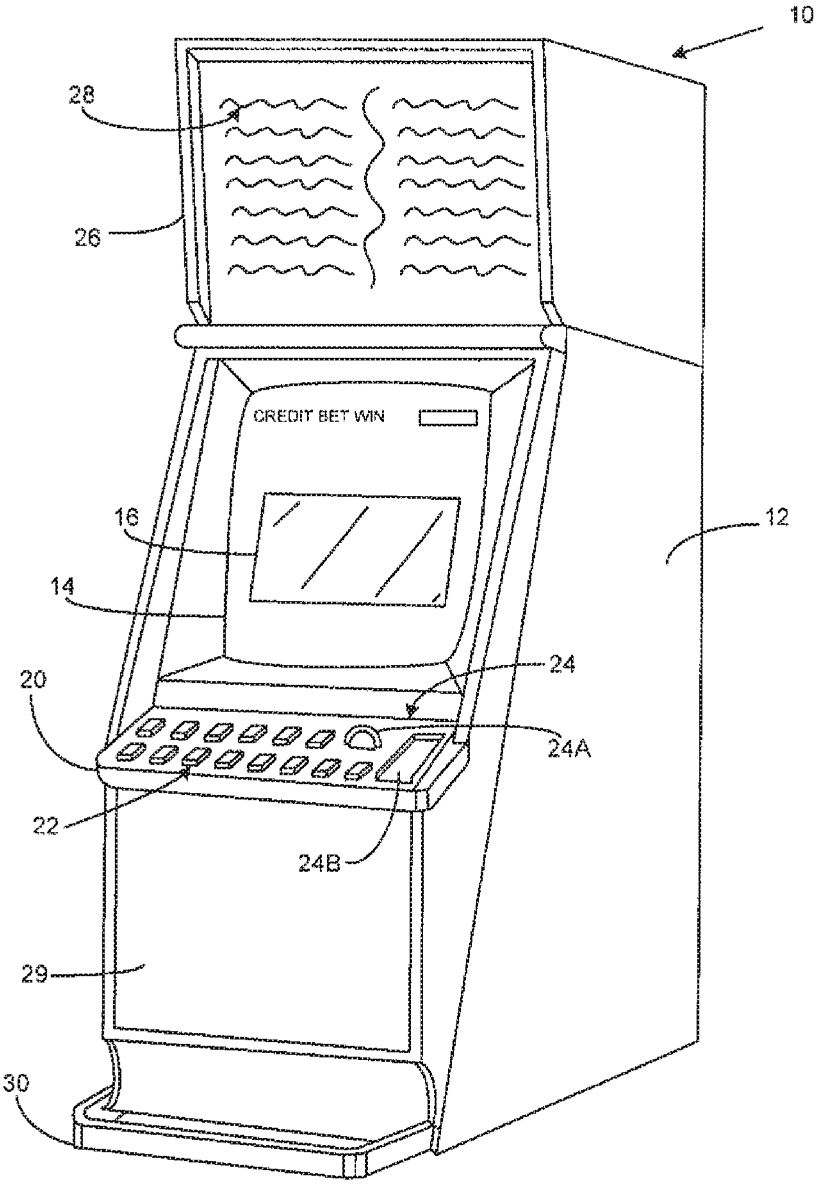
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
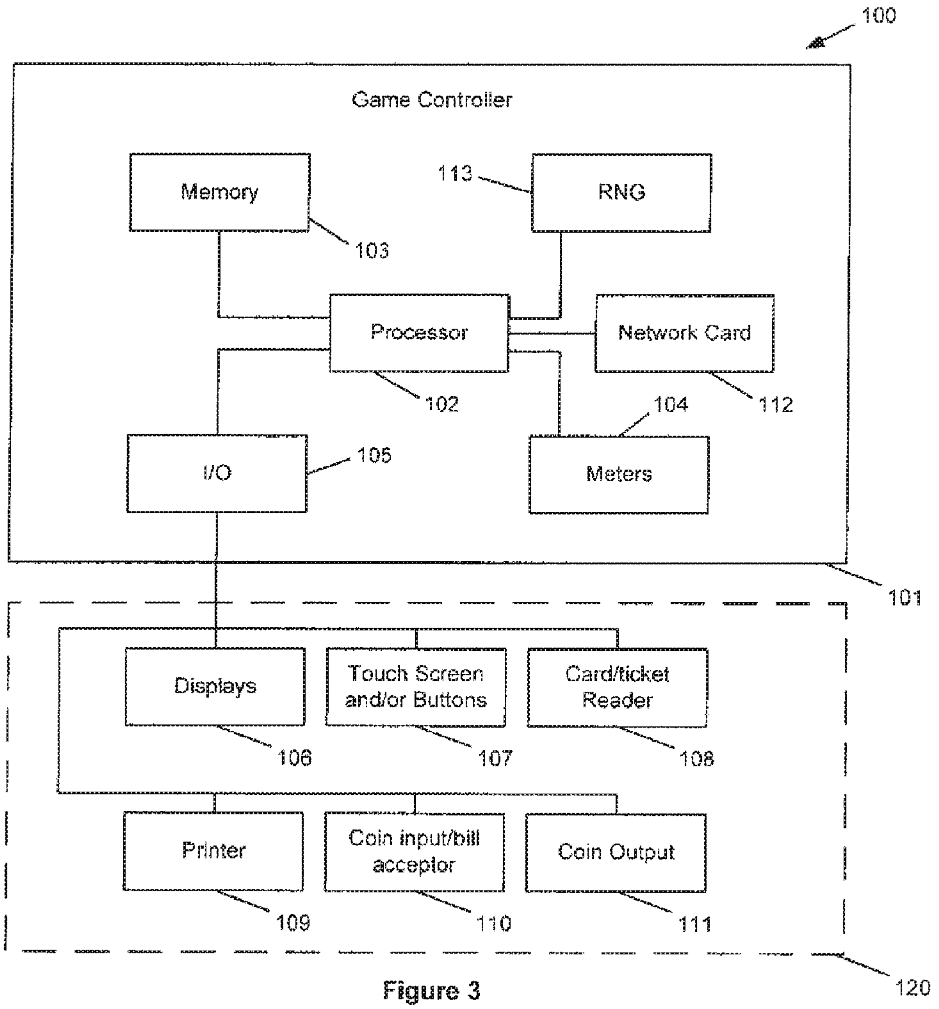
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
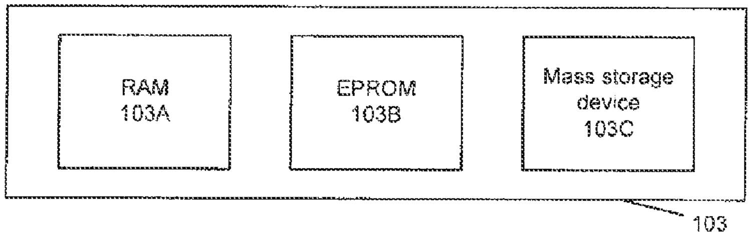
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
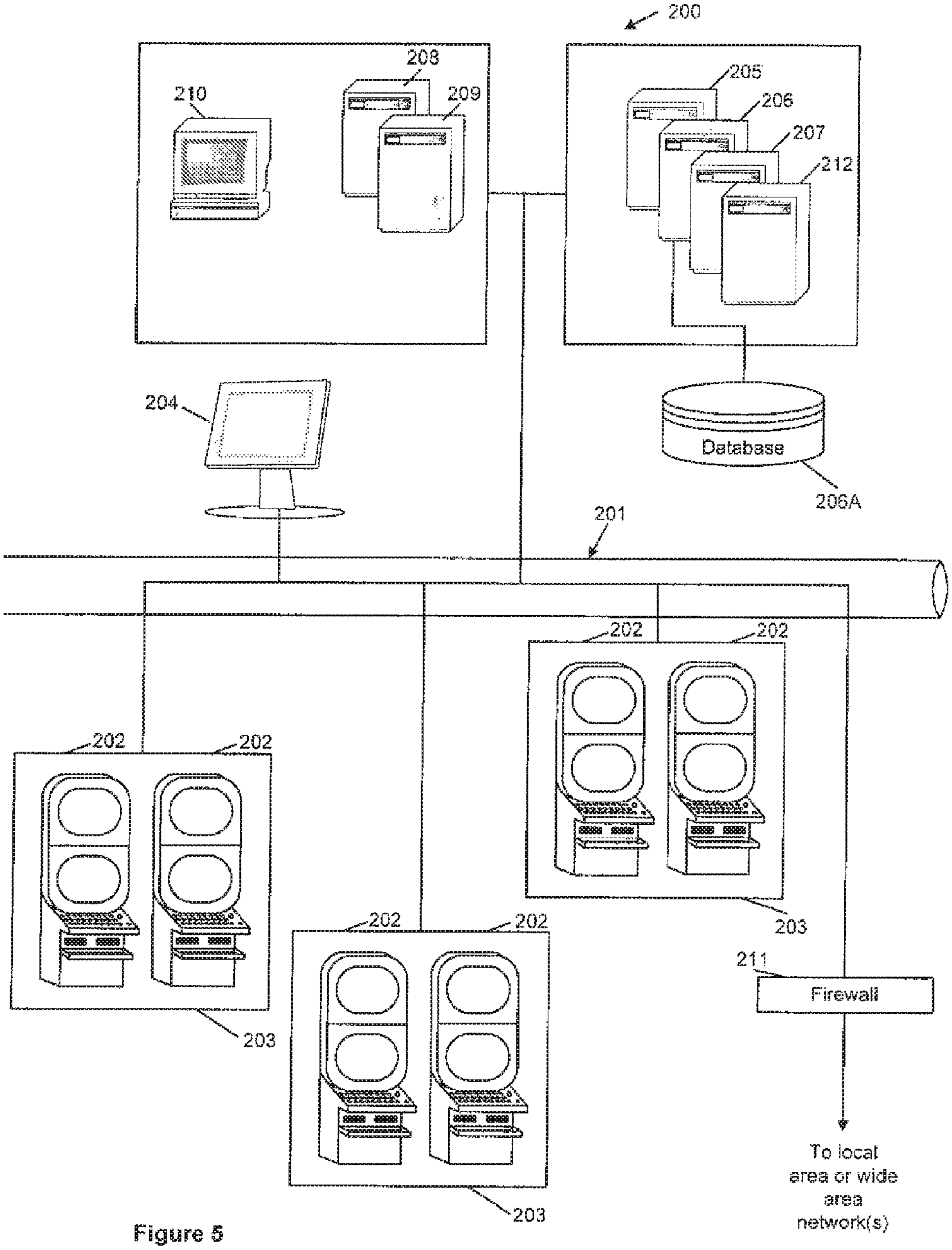
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
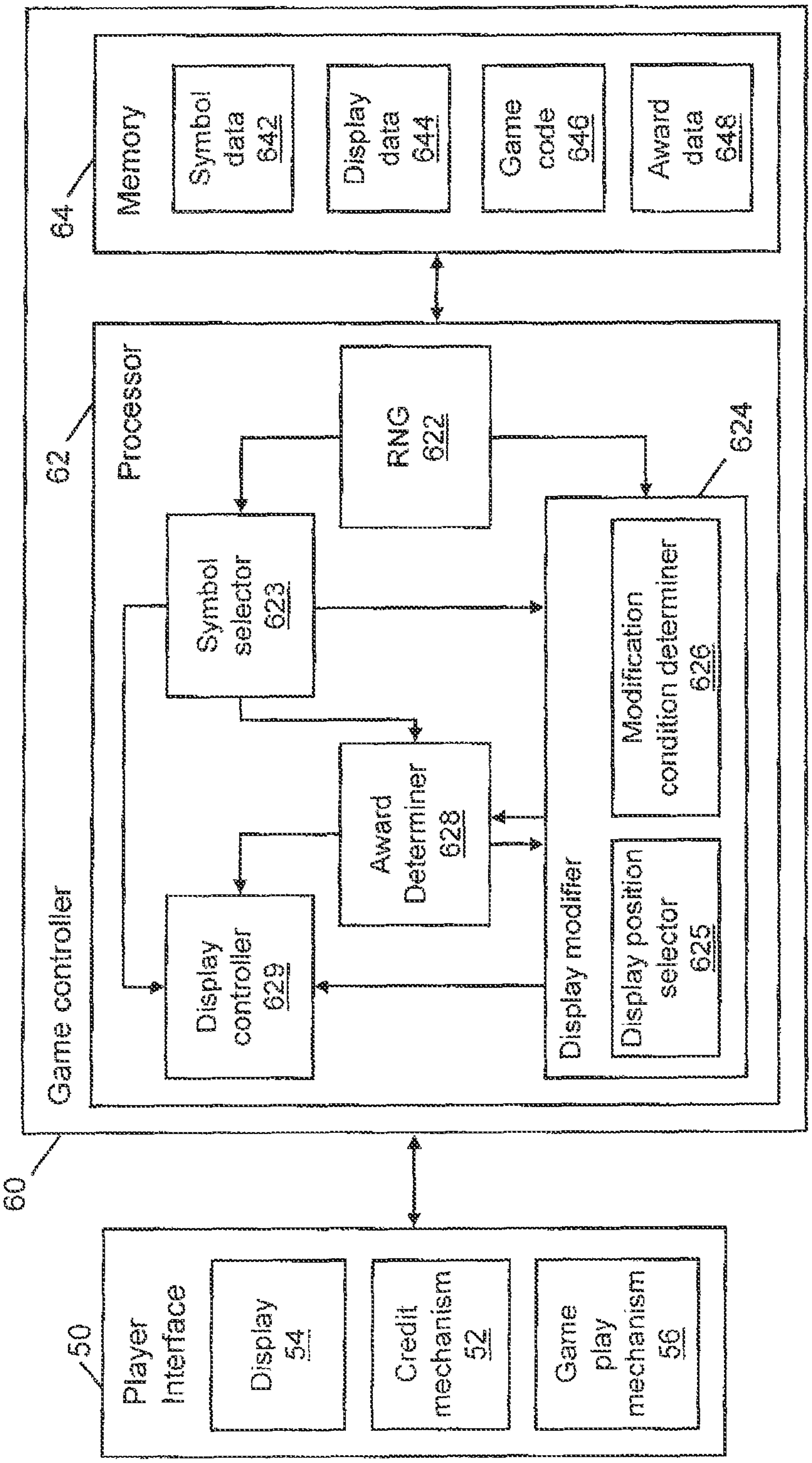
FIG. 6 is a further block diagram of a gaming system.

FIG. 6 shows the functional components of an example of the gaming system. As shown in the figure, a game controller 60 comprising a processor 62 is arranged to implement a number of modules based on program code and data stored in memory 64 so as to implement a game where a plurality of symbols are selected and displayed at a plurality of sets of display positions, and where during game play, the displayed symbols are modified by interchanging a first set of symbols displayed at a first set of display positions with a second set of symbols displayed at a second set of display positions.

Persons skilled in the art will appreciate that the modules are typically implemented using a processor based on program code and data stored in memory but that one or more of the modules could alternatively be implemented in some other way, for example by a dedicated circuit.

In this example, the game is a spinning-reel type game comprising a number of columns of display positions corresponding to respective ones of a plurality of reels. Persons skilled in the art will appreciate that such a spinning-reel type game may vary in terms of the number of columns or the number of display positions per column. For example, the game may be a 4×6 spinning-reel type game comprising four columns, each column having 6 vertically adjacent display positions; a 5×3 spinning-reel type game comprising five columns, each column having 3 vertically adjacent display positions etc.

It is envisaged that the spinning-reel type game can be a line-based game or a reel-based game. In a line-based game, a player's win entitlement is based on how many win lines the player plays in each game (for example, a minimum of one win line up to the maximum number of win lines allowed by the game) and how much they wager per line. Such win lines are typically formed by a combination of symbol display positions, one from each reel, the symbol display positions being located relative to one another such that they form a line. Persons skilled in the art will appreciate that in some line-based games, the player's win entitlement may not be strictly limited to the lines they have selected, for example, "scatter" pays can be awarded independently of a player's selection of pay lines and can be an inherent part of a win entitlement.

In a reel-based game, a player obtains a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. Thus, for a 5×3 spinning-reel type game having five reels and fifteen display positions, there can be 243 ways to win.

In FIG. 6, the gaming system comprises a player interface 50 having a display 54 arranged to display to a player a symbol in each of a plurality of sets of display positions of the game. In the embodiment, each set of display positions corresponds to one of the reels. For example, on a 5×3 spinning-reel type game, a set of display positions can be the 3 vertically adjacent symbols of a reel etc.

In this embodiment, the game controller 60 also includes memory 64 comprising game code 646 for implementing the modules. Memory 64 also includes, for use by the modules, symbol data 642, display data 644 and award data 648. The symbol data 642 comprises a plurality of symbols that may be selected for display on display 54 during a game. The display data 644 comprises one or more predetermined sets of display positions that may be selected during a game. The award data 648 comprises a plurality of awards that may be made.

Examples of awards include monetary prizes, bonus credits, feature games etc. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

The modules implemented by the processor 62 include a Random Number Generator (RNG) 622 and a display controller 629. The Random Number Generator (RNG) 622 is arranged to generate random numbers (including pseudo-random numbers) for use by the other modules. Persons skilled in the art will appreciate that the RNG 622 may in another example be implemented in a separate device, for example, in a Random Number Generator server. The display controller 629 is arranged to communicate with the player interface 50 to control the display 54 of the player interface 50.

In addition to the display controller 629 and the RNG 622, the modules implemented by the processor 62 include a symbol selector 623, a display modifier 624 and an award determiner 628.

The symbol selector 623 is arranged to select a symbol for display on display 54 at each of the display positions of the game. In this embodiment, the symbol selector 623 is arranged to select each symbol from symbol data 642 stored in memory 642. The manner in which the symbol selector 623 selects a symbol may be carried out in a variety of ways. For example, the symbol data 642 can specify a sequence of symbols for each reel such that the symbol selector 623 can select all of the symbols of a reel by selecting a stopping position in the sequence. In one example, three symbols of each of five reels may be displayed such that symbols are selected for display at fifteen display positions on display 54. It is known to use a probability table stored in memory 64 to vary the odds of a particular stop position being selected.

The display modifier 624 is arranged to modify the displayed symbols by interchanging one or more sets of the symbols displayed in the plurality of display positions with another one or more sets of the symbols displayed in the plurality of display positions. For example, on a 5×3 spinning-reel type game, the display modifier 624 can modify the displayed symbols of two reels by interchanging the symbols of the left-most reel with the symbols of the middle reel. In another example, the display modifier 624 can modify four reels of displayed symbols by interchanging the symbols of the left-most reel with the symbols of the middle reel and the symbols of the right-most reel with the symbols of the second-left-most reel. In some embodiments, the display modifier 624 may modify the displayed symbols more than once. For example, after the display modifier 624 has performed a first round of modification, the display modifier 624 can perform a second round of modification to modify the displayed symbols again by interchanging a further one or more sets of symbols displayed in the plurality of display positions with another further one or more sets of symbols displayed in the plurality of display positions as modified.

In the embodiment, the display modifier 625 is arranged to modify the displayed symbols using a display position selector 625 and a modification condition determiner 626.

The modification condition determiner 626 is arranged to determine whether a modification condition is met. The display modifier 694 is arranged to modify the displayed symbols upon the modification condition being met. The modification condition can be based on one or more game conditions or can be random. Examples of a modification condition based on game conditions include: whether an ante bet has been made by a player, whether an award is to be made to a player based on the symbols displayed on the plurality of display positions prior to modification of the displayed symbols, whether no award is made to a player based on the symbols displayed on the plurality of display positions prior to modification of the displayed symbols, whether a certain sized wager has been made by a player, whether a player has selected all the win lines of a game, whether a player has played sufficient games, whether a player is a member of a loyalty program etc. In other embodiments, the modification condition determiner 626 determines whether a modification is met randomly (for example, based on random numbers or pseudo random numbers generated by the RNG 622).

The display position selector 625 is arranged to select, from the plurality of display positions of the game, sets of display positions to be modified. Depending on the implementation, the display position selector 625 can select the sets of display positions either based on predetermined display data 644 stored in memory 64 or randomly based on random numbers or pseudo random numbers generated by the RNG 622.

In the embodiment, the award determiner 628 is arranged to determine whether to make an award based on the symbols displayed at the plurality of sets of display positions prior to the display modifier 624 modifying the displayed symbols selected by the symbol selector 623. In addition, the award determiner 623 is arranged to determine whether to make an award based on the symbols displayed at the plurality of sets of display positions as modified. The award determiner 623 is also arranged to determine whether to make an award based on the symbols displayed at the plurality of sets of display positions as further modified. For example, the award determiner 628 may make an award to a player incrementally, each time after the displayed symbols have been modified. The award determiner 628 determines whether the displayed symbols include on a selected win line (or at symbol positions covered by reel selections) a winning combination. Possible winning combinations are stored as a pay table in the award data 648.

As stated previously, the display controller 629 is arranged to control the display 54. The display controller 629 is arranged to control the display 54 based on communication from the symbol selector 623, the display modifier 624 and/or the award determiner 628. For example, the display controller 629 can control the display 54 to: display the symbols selected by the symbol selector 623 in the plurality of display positions, display the symbols as modified by the display modifier 624, display that an award is to be made based on a determination by the award determiner 628, display an option to allow a player to use an input device (such as the game play mechanism 56) of the player interface 50 to select either an award determined before modification of symbols or an award determined after modification of symbols if the award determiner 623 has determined that awards may be made both before and after modification of symbols etc.

It is envisaged that the display controller 629 can control the display 54 to display the modification of symbols in a variety of ways including: displaying symbols displayed at different display positions swapping with one another on the display 54, displaying symbols hopping from one display position to another display position on the display 54, displaying symbols sliding from one display position to another display position on the display 54, displaying symbols flipping from one symbol to another symbol on the display 54, displaying symbols shifting from one display position to another display position, displaying columns rearranging with each other, displaying symbols being transported from one display position to another display position etc.

It is envisaged that the display 54 is a video display and that the reels of display positions are displayed as virtual reels on the video display. However, persons skilled in the art will appreciate that the display 54 can also be implemented using mechanical or electro-mechanical reels. For example, a reel on a mechanical display can be mechanically rotated from its position to the position of another reel, provided the reels are configured such that the same symbols can be displayed.

It is also envisaged that animation can be used to highlight the modification of displayed symbols (for example, peripheral lights on a gaming machine may flash when the reels are being interchanged during game play) and that information can be shown to explain the modification of displayed symbols (for example, before a game starts).

Figure 7:
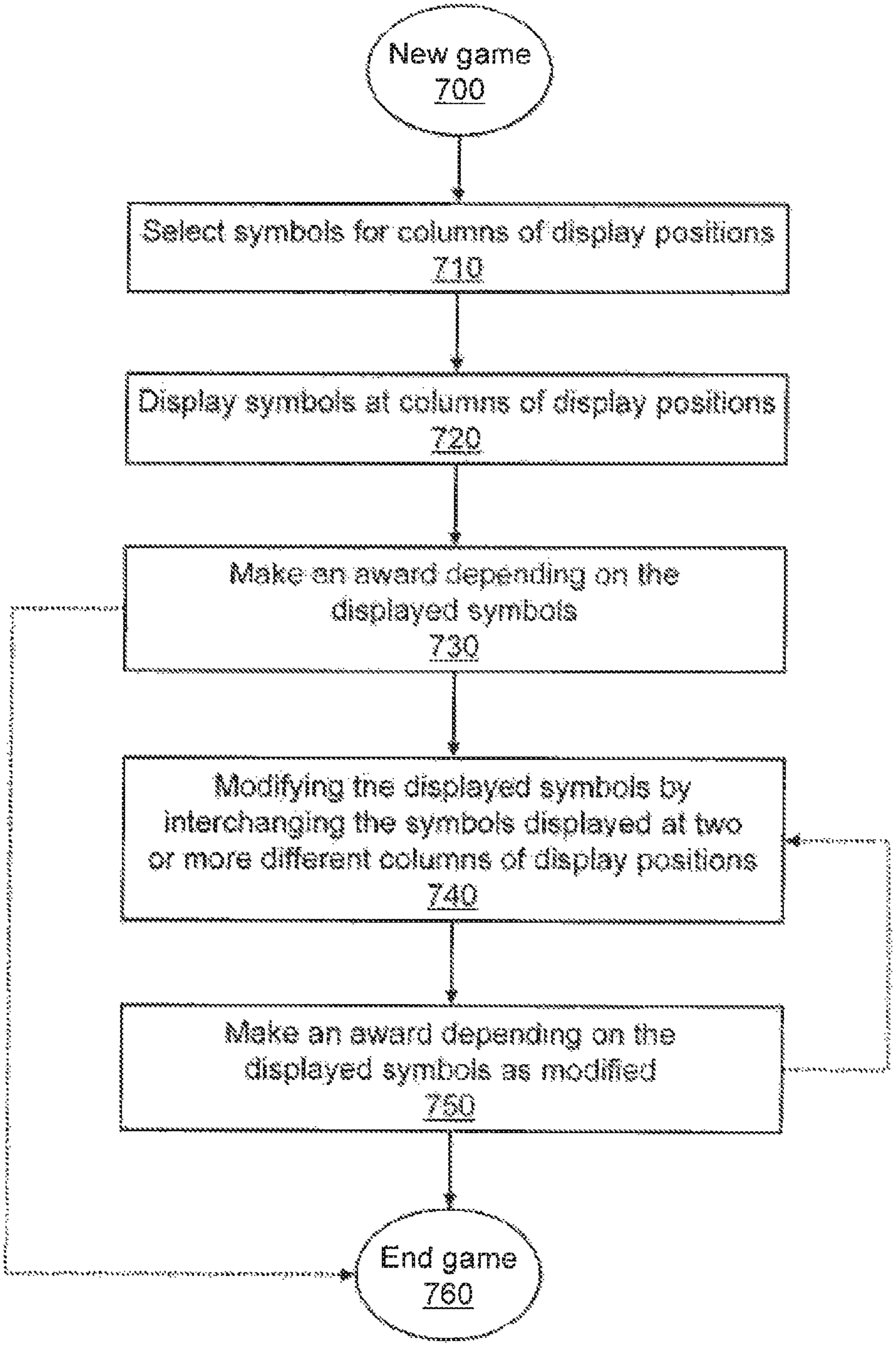
FIG. 7 is a flow chart of an embodiment.

FIG. 7 is a flowchart illustrating an embodiment of the method of gaming. At step 700, a new spinning-reel type game is started by a player using the game play mechanism 56. At step 710, the symbol selector 623 selects a symbol for display at each display position of the plurality of columns or reels of display positions displayed on the display 54. At step 720, the selected symbols are displayed on the display 54 at each display position of the plurality of columns or reels of display positions. At step 730, the award determiner 628 determines whether to make an award based on the displayed symbols.

In this embodiment, some of the displayed symbols are then selected by the display position selector 625 for modification by the display modifier 624 which interchanges the symbols displayed at two or more different columns of display positions 740. As discussed previously, in alternative embodiments, the display modifier 624 can be arranged to modify the displayed symbols only upon a modification condition being met (as determined by the modification condition determiner 626). In an embodiment, if the modification condition is not met, the game ends 760.

As discussed previously, the modification of symbols can be displayed in many ways including as symbols shifting from one display position to another display position etc.

After the symbols of selected display positions are modified, the award determiner 628 determines whether to make an award based on the symbols displayed at the plurality of columns of display positions as modified 750.

In an embodiment, the symbols displayed at the plurality of columns of display positions as modified may be modified again (that is, by again interchanging the symbols displayed at two or more different columns of display positions). This modification of symbols and determination of whether to make an award based on the modified symbols can be repeated any number of times. The number of times the process of modifying symbols and determining whether to make an award can be defined, random, or based on a particular criteria being satisfied (for example, until an award is made or all combinations are exhausted, until no award is made etc). At step 760, the game ends. In embodiments where the award determiner 628 has determined that multiple awards are to be made, an option may be displayed on a display to allow the player to select which one of the awards he or she wishes to take.

Further aspects of the method will be apparent from the above description of the system. It will be appreciated that at least part of the method will be implemented electronically, for example digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

Example

Figure 8A:
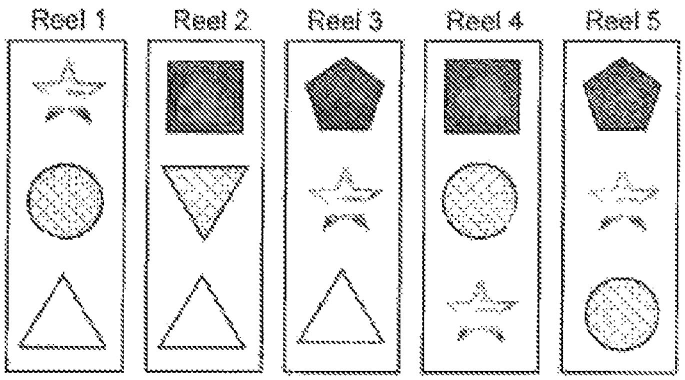
FIGS. 8A and 8B are diagrammatic representations of an example of a game.
Figure 8B:
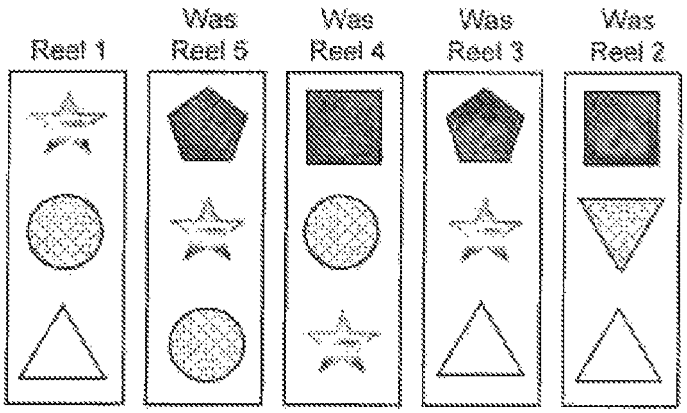

FIGS. 8A and 8B illustrate an example of how symbols displayed at two different columns or reels of display positions on the display 54 may be modified and displayed on display 54. As shown in these figures, the game is a 5×3 spinning-reel type game having 5 reels of display positions (referred to as “Reel 1”, “Reel 2”, “Reel 3”, “Reel 4”, and “Reel 5” in FIG. 8A), each reel comprising 3 display positions arranged in a column. In this spinning-reel type game, there are 6 possible symbols that can be displayed at each display position.

FIG. 8A illustrates a display of symbols initially selected by the symbols selector 623. As illustrated, there are 3 triangle symbols displayed horizontally adjacent each other at the bottom-most row (sometimes referred to as “line 3”) of the display. Based on the displayed symbols, the award determiner 628 determines that a pay is to be credited to the player. In this example, the modification condition for modifying the displayed symbols is whether a pay is to be credited to a player prior to modifying the symbols. Thus, the modification condition determiner 626 determines that the modification condition for modifying the displayed symbols in this game is met.

Accordingly, the displayed symbols are then modified by the display modifier 624 by rearranging or interchanging the order of the reels. In this example, the display position selector 625 determines the new order of the reels based on predetermined rules for swapping reels stored in display data 644.

After the new order of reels has been determined, the display controller 629 controls the display 54 to display the new order of reels. The new display of symbols is illustrated in FIG. 8B. As shown, Reel 5 has been interchanged with Reel 2, and Reel 4 has been interchanged with Reel 3.

The award determiner 628 then determines whether an award should be made based on the symbols displayed at the 5 reels of display positions as modified. In this example, the award determiner 628 determines that two new pays may be credited to the player; one for the 4 star symbols stretching from Reel 1 to new Reel 4 or previous Reel 3 (sometimes referred to as “line 4”), and another for the 3 circle symbols in Reel 1, new Reel 2 or previous Reel 5, and new Reel 3 or previous Reel 4 (sometimes referred to as “line 18”).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of playing of a game using a gaming machine, the method comprising:

establishing a credit balance in response to a credit input of the gaming machine receiving a physical item associated with a monetary value;

increasing and decreasing the credit balance based at least on a wagering activity;

in accord with the wagering activity, selecting, via a game controller of the gaming machine, a plurality of symbols;

displaying, via a display of the gaming machine, each symbol of the plurality of symbols at a display position of a plurality of sets of display positions;

selecting, via the game controller, at least one modification condition from a plurality of modification conditions;

in response to the plurality of symbols forming a winning outcome, determining, via the game controller, whether the at least one modification condition has been met;

in response to said determining that the at least one modification condition has been met, selecting, via the game controller, a symbol set modification from a plurality of symbol set modifications, and modifying, via said game controller, the plurality of the symbols displayed at the plurality of sets of display positions, including interchanging the symbols displayed at a first set of the plurality of sets of display positions with the symbols displayed at a second set of the plurality of sets of display positions based on the symbol set modification selected from the plurality of symbol set modifications;

awarding a first award based on the winning outcome; and determining whether to make a second award based on the symbols displayed at the plurality of sets of the display positions as modified.

2. The electronic method as claimed in claim 1, wherein each set of the plurality of sets of display positions comprises a column of the display positions.

3. The electronic method as claimed in claim 1, wherein said selecting the symbol set modification from the plurality of symbol set modifications includes selecting the symbol set modification based on the winning outcome.

4. The electronic method as claimed in claim 1, wherein said modifying the plurality of symbols further comprises interchanging the symbols displayed at a third set of the plurality of sets of display positions with the symbols displayed at a fourth set of the plurality of sets of display positions.

5. The electronic method as claimed in claim 1, further comprising:

modifying, via the game controller, the symbols displayed at two different sets of the plurality of sets of display positions; and determining, via the game controller, whether to make a third award based on the symbols displayed at the plurality of sets of display positions as twice modified.

6. The electronic method as claimed in claim 1, further comprising randomly selecting, via the game controller, the second set from the plurality of sets of display positions.

7. The electronic method as claimed in claim 1, wherein the modifying further includes at least one of: displaying on said display a swapping of the symbols of the first set of the plurality of sets of display positions with the symbols of the second set of the plurality of sets of display positions; displaying the symbols of the first set of the plurality of sets of display positions hopping to the second set of the plurality of sets of display positions; displaying the symbols of the first set of the plurality of sets of display positions sliding to the second set of the plurality of sets of display positions; and displaying a symbol from the symbols of the first set of the plurality of sets of the display positions flipping to another symbol from the symbols of the second set of the plurality of sets of display positions.

8. The electronic method as claimed in claim 1, wherein one of said plurality of modification conditions includes whether an ante bet has been made.

9. The electronic method as claimed in claim 1, further comprising repeating the interchanging until all combinations of interchanging are exhausted.

10. The electronic method as claimed in claim 1, further comprising randomly determining an order for interchanging sets of the plurality of sets of display positions.

11. A gaming machine comprising:

a credit input configured to receive a physical item associated with a monetary value to establish a credit balance;

a credit meter configured to monitor the credit balance, the credit balance being increasable and decreasable based at least on a wagering activity;

a display including a plurality of sets of display positions;

a game controller configured to:

select, in accord with the wagering activity, a plurality of symbols;

display, via the display, each symbol of the plurality of symbols at a display position of the plurality of sets of display positions;

select at least one modification condition from a plurality of modification conditions;

in response to the plurality of symbols forming a winning outcome, determine whether the least one modification condition has been met;

in response to determining that the modification condition has been met, select a symbol set modification from a plurality of symbol set modifications, and modify the plurality of symbols displayed at the plurality of sets of display positions, including interchanging the symbols displayed at a first set of the plurality of sets of display positions with the symbols displayed at a second set of the plurality of sets of display positions based on the symbol set modification selected from the plurality of symbol set modifications;

award a first award based on the winning outcome; and award a second award based on the symbols displayed at the plurality of sets of display positions as modified.

12. The gaming machine as claimed in claim 11, wherein each set of the plurality of sets of display positions is displayed as a column of display positions on the display.

13. The gaming machine as claimed in claim 11, wherein the game controller is further configured to randomly select the second set from the plurality of sets of display positions based on the winning outcome.

14. The gaming machine as claimed in claim 11, wherein the game controller is configured to further modify the plurality of symbols by interchanging the symbols displayed at a third set of the plurality of sets of display positions with the symbols displayed at a fourth set of the plurality of sets of display positions.

15. The gaming machine as claimed in claim 11, wherein the game controller is configured to: modify the symbols displayed at two different sets of the plurality of sets of display positions; and determine whether to make a third award based on the symbols displayed at the plurality of sets of display positions as twice modified.

16. The gaming machine as claimed in claim 11, wherein the game controller is further configured to randomly select the second set from the plurality of sets of display positions.

17. The gaming machine as claimed in claim 11, wherein the game controller is further configured to display, at least one of: swapping of the symbols of the first set of the plurality of sets of display positions with the symbols of said second set of the plurality of sets of display positions on the display;

hopping the symbols from the first set of the plurality of sets of display positions to the second set of the plurality of sets of display positions on the display;

sliding the symbols from the first set of the plurality of sets of display positions to the second set of the plurality of sets of display positions on the display; and flipping a symbol from the symbols of the first set of the plurality of sets of display positions to another symbol from the symbols of the second set of the plurality of sets of display positions on the display.

18. The gaming machine as claimed in claim 11, wherein one of said plurality of modification conditions includes whether an ante bet has been made.

19. The gaming machine as claimed in claim 11, wherein the game controller is further configured to repeatedly interchange sets of the plurality of sets of display positions until all combinations of interchanging are exhausted.

20. The gaming machine as claimed in claim 11, wherein the game controller is further configured to randomly determine an order for interchanging sets of the plurality of sets of display positions.

* * * * *